Figure 1:
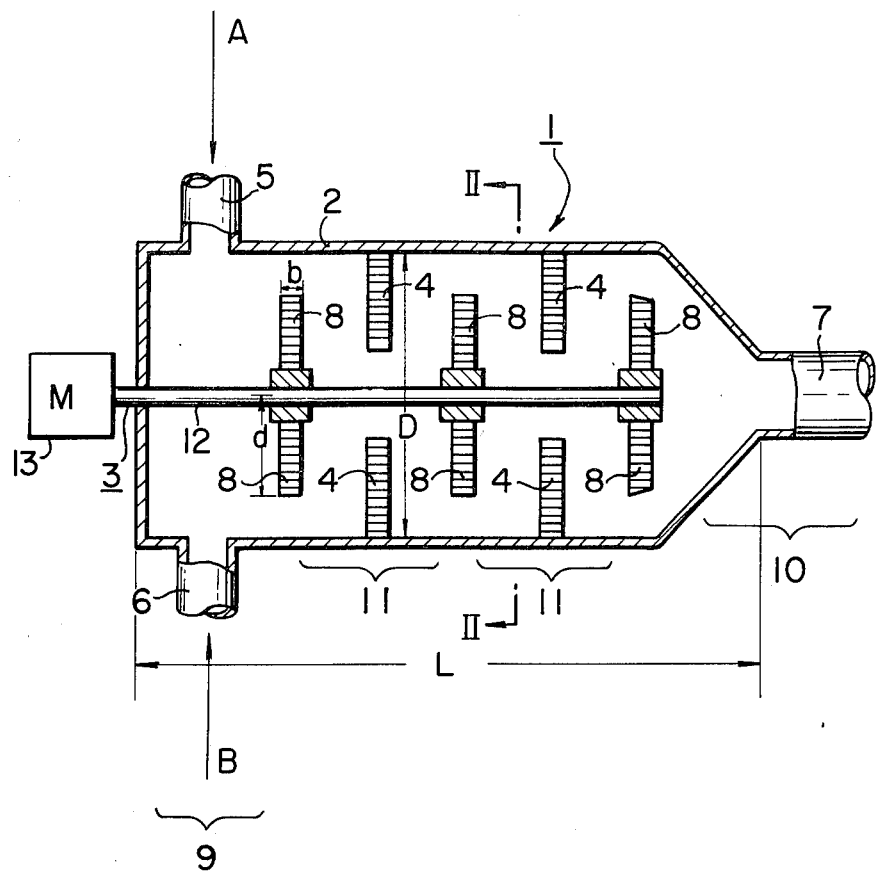

United States Patent [19]

Jiroumaru et al.

[11] 4,446,309

[45] May 1, 1984

[54] METHOD AND APPARATUS FOR CONTINUOUSLY COAGULATING A RUBBERY POLYMER LATEX

[75] Inventors: Takashi Jiroumaru, Yokkaichi; Mamoru Ito, Kuwana, both of Japan

[73] Assignee: Japan Synthetic Rubber Co., Ltd., Tokyo, Japan

[21] Appl. No.: 351,515

[22] Filed: Feb. 23, 1982

[30] Foreign Application Priority Data

Mar. 5, 1981 [JP] Japan .................................. 56-31624

[51] Int. Cl.³ .................................................. C08F 6/22
[52] U.S. Cl. ..................................... 528/486; 523/352; 528/487
[58] Field of Search ............... 528/485, 486, 487, 488; 523/352

[56] References Cited

U.S. PATENT DOCUMENTS

| | | | |
|---|---|---|---|
| 2,459,748 | 1/1949 | Johnson | 528/485 |
| 2,647,103 | 7/1953 | Griffith | 528/485 |
| 3,245,970 | 4/1966 | Drayer | 528/485 |
| 4,103,074 | 7/1978 | Hertel et al. | 528/487 |
| 4,190,721 | 2/1980 | Hertel | 528/486 |

*Primary Examiner*—Paul R. Michl
*Attorney, Agent, or Firm*—Oblon, Fisher, Spivak, McClelland & Maier

[57] ABSTRACT

A method for continuously coagulating a rubbery polymer latex to obtain a polymer solid, characterized in that into a coagulator composed of (a) a cylindrical body having at one end a nozzle for feeding rubbery polymer latex and a nozzle for feeding coagulant solution, and having at the other end a discharging nozzle, (b) a stirrer mounted rotatably along the central axis of the cylindrical body, said stirrer having several stages of agitating blades, and (c) stationary blades fixed to the wall of the cylindrical body at the spaces between the stages of agitating blades, are continuously fed the rubbery polymer latex and a coagulant solution through the above-mentioned respective nozzles so as to collide against each other, and stirred during their movement from the one end of the coagulator to the other end to coagulate the latex. By this method, there can be obtained molded porous polymer crumbs having an intended size.

10 Claims, 2 Drawing Figures

METHOD AND APPARATUS FOR CONTINUOUSLY COAGULATING A RUBBERY POLYMER LATEX

This invention relates to a method and apparatus for continuously obtaining a polymer solid from a rubbery polymer latex by a coagulation method using a coagulant. More particularly, the present invention provides a novel method and a novel apparatus for coagulating a rubbery polymer latex wherein a rubbery polymer solid free from fine particles (hereinafter referred to as "crumbs") is efficiently and easily produced by means of a simple device.

The coagulation method referred to herein means a method for obtaining a polymer in the form of crumbs or other forms by coagulating a rubbery polymer latex in the stabilized state into particles and agregating the resulting particles using a coagulant capable of breaking the micells of the rubbery polymer latex in the stabilized state, for example, an inorganic salt or acid or an organic acid solution or a hydrophilic polar solvent.

In the general industrial operation of the coagulation method, a rubbery polymer latex and a coagulant are fed into a mixing tank or the like, the polymer latex is coagulated batchwise or continuously, by which the polymer is converted to crumbs or other forms, and, the crumbs are subsequently subjected to each of the following after-treatments: solid-liquid separation, washing, dehydration and drying, to obtain the polymer as a solid.

Accordingly, in order to carry out the after-treatments following the coagulation step under industrially and economically advantageous conditions and yet to obtain a solid of excellent quality, the state and properties of the crumbs formed in the coagulation step are extremely important. That is to say, when the crumbs contain a large quantity of fine particles, reduction in productivity due to plugging as well as due to outflow of these fine particles with the separated liquid in the solid-liquid separation step becomes a problem. When the coagulation is incomplete and a part of the polymer latex remains uncoagulated, the uncoagulated latex is separated in the subsequent after-treatment steps, which makes the operations difficult, and causes deterioration of the quality of the polymer solid. When the crumbs formed by coagulation are not sufficiently porous, washing and drying of the crumbs become difficult. When the crumbs lack strength, they are broken into fine particles in the subsequent steps, which makes stable working difficult.

Thus, the properties of the crumbs produced in the coagulation operation, specifically crumbs' particle diameters, particle diameter distribution, porosity and anti-blocking property as well as the presence or absence of uncoagulated polymer latex in the crumbs, greatly affect the industrial operating efficiencies of solid-liquid separation, washing, dehydration and drying steps subsequent to the coagulation step as well as the quality of the polymer solid obtained.

The method for coagulating, for example, styrene-butadiene rubber (hereinafter referred to as "SBR"), includes a method which comprises adding an aqueous sodium chloride solution to a latex in an elongated trough (this operation is called "a creaming operation", and by the addition of the aqueous sodium chloride solution which is an electrolyte to the latex, the latex particles are coagulated to form a viscous cream), and then the cream is mixed with an acid in a coagulating tank while stirring the same with agitating propellers of marine type to complete the coagulation; a method which comprises passing a coagulated polymer encapsulating uncoagulated polymer latex together with a coagulant, through a screw type extruder to break the capsules, thereby completing the coagulation (U.S. Pat. No. 4,103,074); and the like. However, the former method is disadvantageous in that both the size and the number of coagulation tanks must be made large, and in the latter method, the internal structure of the crumbs obtained is dense, namely not porous because of the characteristics of the machine used, which causes inconveniences in the subsequent after-treatments of washing, dehydration and drying. What is important in the coagulation method is:

(1) a rubbery polymer latex and a coagulant solution are mixed as momentarily as possible, and (2) crumbs obtained are porous and do not contain an uncoagulated latex in the interior.

With an aim to develop a coagulation method and a coagulation apparatus for obtaining porous crumbs efficiently and economically, the present inventors have conducted extensive research, and as a result, it has been found that porous crumbs are obtained by mixing a rubbery polymer latex and a coagulant solution in a coagulator having agitating blades.

According to this invention, there is provided a method for continuously coagulating a rubbery polymer latex to obtain a polymer solid, characterized in that into a coagulator composed of (a) a cylindrical body having at one end a nozzle for feeding a rubbery polymer latex and a nozzle for feeding a coagulant solution, and having at the other end a discharging nozzle, (b) a stirrer mounted rotatably along the central axis of the cylindrical body, said stirrer having several stages of agitating blades, and (c) stationary blades fixed to the wall of the cylindrical body at the spaces between the stages of agitating blades, are continuously fed the rubbery polymer latex and a coagulant solution through the respective nozzles mentioned above in such proportions that the polymer solids content in the coagulator becomes 5–50% by weight based on the total weight of the latex and the coagulant solution so as to collide against each other and subjected during their movement from the one end of the coagulator to the other end to highly fluidized state caused by a stirring power of at least 20 KW/m$^3$.

The present invention further provides a coagulator consisting essentially of (a) a cylindrical body having at one end a nozzle for feeding rubbery polymer latex and a nozzle for feeding coagulant solution, and having at the other end a discharging nozzle, (b) a stirrer mounted rotatably along the central axis of the cylindrical body, said stirrer having several stages of agitating blades, and (c) stationary blades fixed to the wall of the cylindrical body at the spaces between the stages of agitating blades.

Figure 2:
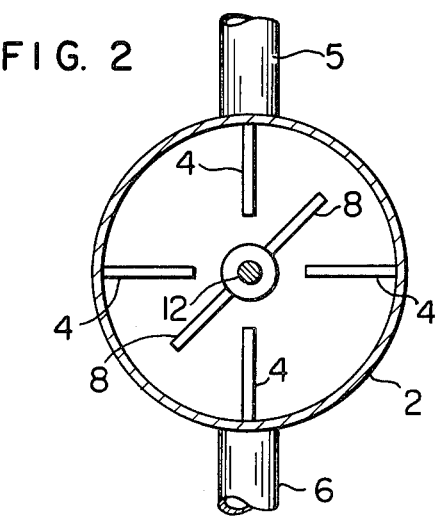

An embodiment of the method of this invention is explained below referring to the accompanying drawings, in which FIG. 1 shows a sectional view for illustrating an example of the coagulator of this invention, in which 1 stands for coagulator, 2 for cylindrical body, 3 for stirrer, 4 for stationary blades, 5 for nozzle for feeding latex, 6 for nozzle for feeding coagulant solution, 7 for discharging nozzle, 8 for agitating blades, 9 and 10 for the ends of the body 2, 11 for intermediate spaces of the body, 12 for stirring shaft, 13 for motor, A for rubbery polymer latex, and B for coagulant solution, and FIG. 2 shows a sectional view along the line II—II of the coagulator in FIG. 1.

The coagulator 1 has the cylindrical body 2 and also has the stirrer 3 in its interior. The wall of the cylindrical body has the stationary blades 4. A rubbery polymer latex A and a coagulant solution B are fed into the coagulator 1 through the nozzles 5 and 6, and these two liquids are moved to the other end of the cylindrical body with stirring. During the movement, coagulation and molding take place, and a molded coagulum is discharged from the discharging nozzle 7, and then the coagulum is forwarded to after-treatment steps (not indicated) such as solid-liquid separation, washing, dehydration and drying. The rubbery polymer latex A and the coagulant solution B momentarily come into contact, whereby coagulation takes place and coagulum is formed. The coagulum is destroyed by the agitating blades 8 and the stationary blades 4 and is formed into porous crumbs by the shearing force of these blades. The size of the crumbs can be made into any desired one by freely selecting the shapes of the agitating blades 8 and the stationary blades 4 as well as the stirring power. As the inside of the coagulator 1 is always stirred, there occurs no adhesion or deposition of crumbs to or on the wall of the cylindrical body 2 and the stationary blades 4.

In the present invention, the rubbery polymer latex A and the coagulant solution B are fed into the coagulator in which a highly fluidized state is formed by a stirring power per unit volume of at least 20 KW/m$^3$, whereby the two liquids are momentarily mixed homogeneously and coagulation is completed.

In order to obtain porous crumbs having a proper size, there are adequately adjusted the polymer solids content in the coagulator 1, the stirring power, the fluidized state and the interior configuration of the coagulator 1. That is to say, the formation of the crumbs depends on the balance between the adhering force of the polymer particles per se and the dispersing force caused by the fluidization. Therefore, when the polymer solids content in the coagulator 1 (hereinafter referred to as "slurry concentration") is high, the distances between the particles become small, whereby crumbs of dense structure are obtained. When the slurry concentration is low, the distances between the particles become large, whereby porous crumbs are obtained. For this reason, the slurry concentration in the coagulator 1 is 5 to 50% by weight, preferably 5 to 15% by weight, based on the total weight of the latex and the coagulant solution.

Thus, the porous crumbs having the desired size free from uncoagulated latex and fine particles can be obtained by appropriately selecting the coagulation conditions fitting the coagulation characteristics of the rubbery polymer latex, namely the slurry concentration as well as the fludization conditions of the rubbery polymer latex and the coagulant solution.

The rubbery polymer latex used in the coagulation method of this invention may be any of the rubbery polymer latexes produced in conventional emulsion polymerization methods. Specifically, these latexes include those of styrene-butadiene rubber (SBR), acrylonitrile-butadiene rubber (NBR), polybutadiene rubber, acrylic rubber, vinyl acetate copolymer rubber, chloroprene rubber and mixtures of two or more of them, as well as creamy latexes formed by adding an electrolyte to any one of the above latexes. Preferred is a creamy latex formed by adding an aqueous sodium chloride solution to the SBR latex so that the proportion of the sodium chloride becomes 5 to 60% by weight based on the weight of the polymer solid.

The coagulant may be any material having an ability to coagulate the rubbery polymer latex. Known coagulants are aqueous acid or salt solutions. Aqueous solutions of sulfuric acid, hydrochloric acid, phosphoric acid, acetic acid and the like are suitable as the aqueous acid solution, and aqueous solutions of $Ca(NO_3)_2$, $Al_2(SO_4)_3$, NaCl, and the like are suitable as the aqueous salt solution. The other known coagulants are organic solvents such as ketones (for instance, acetone), alcohols (for instance, methyl alcohol and ethyl alcohol), and their mixtures. The quantity of the coagulant used may vary depending upon the coagulability of the rubbery polymer latex used and the ability of the coagulant to coagulate the latex. Accordingly, when an aqueous solution of an acid or a salt is used, the concentration of the acid or the salt is not constant.

The coagulation apparatus of this invention is explained below referring to the accompanying drawing. In the drawings, the coagulator 1 is composed of the body 2, the stirrer 3 and the stationary blades 4. The body 2 is preferably a tube having a circular section. The body 2 has at both sides of its one end 9 the nozzle 5 for feeding a rubbery polymer latex and the nozzle 6 for feeding a coagulant solution and at the other end 10 the discharging nozzle 7. The nozzles 5 and 6 are preferably fixed facing each other. The stationary blades 4 are fixed on the wall of the body 2. At least one stationary blade 4 is attached to the wall of the body at the spaces between the stages of agitating blades 8 as described hereinafter, so that the stationary blades are fixed in the direction perpendicular to the stirrer shaft 12. The shape of the stationary blades 4 is not critical, but they are preferably in the form of plates. The width (b) of the blade is preferably 20 to 30 mm.

The inside diameter (D) of the body 2 may vary depending upon the amount of crumbs to be produced and the desired diameter of crumbs, but is practically 150 to 500 mm. The length (L) of the body 2 is practically 300 to 800 mm. The ratio (L/D) of the body is 1.5/1 to 2.5/1, the length (d) of the agitating blades to the inside diameter (D) of the body (d/D) is $\frac{1}{4}$ to $\frac{3}{8}$, and the width (b) to the length (d) of the agitating blades (b/d) is 1/2.5 to 1/5.

The stirrer 3 is mounted rotatably along the central axis of the body 2 and has several stages of agitating blades 8, each stage having several, preferably 2 to 4, paddle-shape blades fixed to the stirrer shaft at an angle of 45° to 90°. The number of stages of the agitating blades 8 may vary depending upon the amount of crumbs to be produced and the desired diameter of crumbs, though it is 3 to 5 practically.

The coagulator 1 may be of a horizontal or vertical shape. The selection of either of them may be made in view of its relation to accessories and after-treatment steps.

The method and the apparatus of the present invention bring about the following advantages:

(1) Coagulation is completed momentarily and there is no uncoagulated latex at all.

(2) Because porous crumbs having a desired size are formed, after-treatment operations such as solid-liquid separation, washing, dehydration and drying become easier and the apparatus is simpler.

(3) Because the efficiency of contact between the polymer latex and the coagulant is excellent, the quantity of the coagulant used can be reduced.

As seen above, by the use of the coagulation method and the coagulation apparatus of this invention, an industrially advantageous coagulation process can be accomplished, and its industrial value is great.

The present invention is illustrated below referring to Examples. These Examples are only by way of illustration and not by way of limitation.

EXAMPLES

Into the coagulator 1 shown in the accompanying drawings (the inside diameter (D) of the body 2 is 300 mm and the length (L) thereof is 700 mm) was fed at a flow rate of 20 m$^3$/hr from the nozzle 5 having an inside diameter of 80 mm a creamy latex at 40° C. obtained by adding an aqueous sodium chloride solution to a latex of SBR (JSR #1500 manufactured by Japan Synthetic Rubber) so that the proportion of sodium chloride became 10 to 60% by weight based on the weight of the polymer solid. From the nozzle 6 having an inside diameter of 80 mm, there was fed at a flow rate of 20 m$^3$/hr an aqueous coagulant solution in which the proportion of sulfuric acid in the solution was adjusted to 10% by weight based on the weight of the polymer solid. The latex and the coagulant solution were stirred by rotating at 1,800 r.p.m. the stirrer 3 having three stages of agitating blades, each stage having two paddle-shape blades of 100 mm in length and 30 mm in width (d), fixed to the stirrer shaft at an angle of 90°. The completely coagulated slurry was moved to and sufficiently stabilized at the same temperature in a stirring tank (not shown in the drawing) having an inside diameter of 1 m and having inside a revolution-variable stirrer having two stages of propellers, each stage having three propellers, in which tank the mean residence time of the slurry was 15 min. The crumbs thus formed had the properties shown in Table 1. The slurry concentration was adjusted to 11% by weight.

COMPARATIVE EXAMPLES

To an elongated trough, which is used in the conventional method, were added a latex of SBR (the same as used in the Examples) and an aqueous sodium chloride solution so that the proportion of sodium chloride became 10 to 60% by weight based on the weight of the polymer solid. The thus obtained creamy latex at 40° C. was fed into a stirring tank (the same as used in the Examples) at a flow rate of 20 m$^3$/hr. Simultaneously, there was fed into the tank at a flow rate of 20 m$^3$/hr an aqueous coagulant solution in which the proportion of sulfuric acid in the solution was adjusted to 10%, 25% by weight based on the weight of the polymer solid. The latex and the solution were stirred to sufficiently stabilize the system. The crumbs thus obtained had the properties shown in Table 2.

The particle diameter distribution was measured by the wet method using the Tyler standard sieve. The stirring power required was measured by the use of a torque meter and expressed as net power (KW/m$^3$).

As shown in Tables 1 and 2, in the method of this invention, coagulation operation could be carried out even in such an amount of the coagulant (sodium chloride is also a coagulant) that the operation was impossible in the conventional method. Also in the present process, the time required for the system to be stabilized could be largely reduced. In the present process, when the amount of the coagulant (sodium chloride) was decreased, the time required for the system to be stabilized became somewhat longer but porous crumbs having a higher water content were obtained.

TABLE 1

| Run No. | 1 | 2 | 3 |
|---|---|---|---|
| Flow rate of polymer latex | 20 m$^3$/hr | Same as left | Same as left |
| Reynolds number at the nozzle outlet | 25,000 | Same as left | Same as left |
| Quantity of sodium chloride solution added (as sodium chloride solids) based on polymer solid | 10% by weight | 25% by weight | 60% by weight |
| Flow rate of aqueous solution of coagulant | 20 m$^3$/hr | Same as left | Same as left |
| Reynolds number at the nozzle outlet | 160,000 | Same as left | Same as left |
| Slurry concentration | 11% by weight | Same as left | Same as left |
| Stirring power | 400 KW/m$^3$ | 390 KW/m$^3$ | 370 KW/m$^3$ |
| Particle diameter of molded crumbs | 10 to 20 mm | 5 to 15 mm | 5 to 10 mm |
| Time required for the system to be stabilized | 20 min | 15 min | Same as left |
| Water content in crumbs (dry basis) | 300% | 230% | 200% |
| Porosity of crumbs | Yes | Yes | Yes |

TABLE 2

| Run No. | 4 | 5 | 6 |
|---|---|---|---|
| Flow rate of polymer latex | 20 m$^3$/hr | Same as left | Same as left |
| Quantity of sodium chloride solution added (as sodium chloride solids) based on polymer solid | 10% by weight | 25% by weight | 60% by weight |
| Flow rate of aqueous solution of coagulant | 20 m$^3$/hr | Same as left | Same as left |
| Slurry concentration | 11% by weight | Same as left | Same as left |
| Particle diameter of molded crumbs | Operation was impossible. | Operation was impossible. | 5 to 30 mm |
| Time required for the system to be stabilized | | | 35 min |
| Water content in crumbs (dry basis) | | | 180% |
| Porosity of crumbs | | | No |

What is claimed is:

1. A method for continuously coagulating a rubbery polymer latex to obtain a polymer solid, characterized in that into a coagulator consisting essentially of (a) a cylindrical body having at one end a nozzle for feeding rubbery polymer latex and a nozzle for feeding coagulant solution and having at the other end a discharging nozzle, (b) a stirrer mounted rotatably along the central axis of the cylindrical body, said stirrer having several stages of agitating blades, and (c) stationary blades fixed to the wall of the cylindrical body at the spaces between the stages of the agitating blades, are continuously fed the rubbery polymer latex and a coagulant solution through the above-mentioned respective nozzles in such proportions that the polymer solids content in the coagulator becomes 5–50% by weight based on the total weight of the latex and the coagulant solution so as to collide against each other, and subjected during their movement from the one end of the coagulator to the other end to highly fluidized state caused by a stirring power of at least 20 KW/m$^3$.

2. A method according to claim 1, wherein the rubbery polymer latex is a latex of styrene-butadiene rubber, acrylonitrile-butadiene rubber, polybutadiene rubber, acrylic rubber, vinyl acetate copolymer rubber, chloroprene rubber or a mixture of two or more of them.

3. A method according to claim 1, wherein the rubbery polymer latex is a latex of styrene-butadiene rubber.

4. A method according to claim 3, wherein the latex of styrene-butadiene rubber is a creamy latex formed by adding an aqueous sodium chloride solution to the latex so that the sodium chloride solid content in the solution becomes 5 to 60% by weight based on the weight of the polymer solid.

5. A method according to claim 1, wherein the coagulant solution is an aqueous solution of an acid or a salt.

6. A method according to claim 5, wherein the aqueous acid solution is an aqueous solution of sulfuric acid, hydrochloric acid, phosphoric acid or acetic acid.

7. A method according to claim 5, wherein the aqueous salt solution is an aqueous solution of $Ca(NO_3)_2$, $Al_2(SO_4)_3$ or NaCl.

8. A method according to claim 1, wherein the coagulant solution is an organic solvent.

9. A method according to claim 8, wherein the organic solvent is a ketone or an alcohol or a mixture thereof.

10. A method according to claim 9, wherein the ketone is acetone, and the alcohol is methyl alcohol or ethyl alcohol.

* * * * *